United States Patent
Al-Otaibi

(10) Patent No.: US 6,173,578 B1
(45) Date of Patent: Jan. 16, 2001

(54) AIR CONDITIONING FOR COOLING VEHICLE ENGINE AND PROVIDING COOLING INSIDE THE VEHICLE

(76) Inventor: Saidan Sh. M. Al-Otaibi, P.O. Box 32296, Riyadh 11428 (SA)

(*) Notice: Under 35 U.S.C. 154(b), the term of this patent shall be extended for 0 days.

(21) Appl. No.: 09/307,951

(22) Filed: May 10, 1999

(51) Int. Cl.[7] .............................. B60H 1/32; F25B 27/00
(52) U.S. Cl. ..................... 62/239; 62/238.6; 62/323.1; 123/41.19
(58) Field of Search .................. 62/323.1, 238.6, 62/239; 123/41.15, 41.19

(56) References Cited

U.S. PATENT DOCUMENTS

| | | |
|---|---|---|
| 3,918,270 | 11/1975 | Dixon et al. . |
| 4,036,288 | 7/1977 | Neveux . |
| 4,253,310 * | 3/1981 | Sokolov .............................. 62/238 X |
| 4,351,162 * | 9/1982 | Yee ......................................... 62/239 |
| 4,425,765 | 1/1984 | Fukushima et al. . |
| 4,516,406 * | 5/1985 | Gentry et al. .................... 62/323.1 X |
| 4,616,484 * | 10/1986 | Mehdi et al. ................... 62/238.6 X |
| 4,890,463 * | 1/1990 | Cantoni ............................... 62/238.3 |
| 4,949,553 | 8/1990 | Suzuki . |
| 5,190,100 | 3/1993 | Hoshino et al. . |
| 5,246,064 | 9/1993 | Hoshino et al. . |
| 5,444,991 * | 8/1995 | Cox ................................. 62/323.1 X |
| 5,505,253 | 4/1996 | Heraud . |
| 5,520,015 * | 5/1996 | Lukas et al. ........................... 62/506 |
| 5,537,837 | 7/1996 | Hsieh . |
| 5,605,051 | 2/1997 | Iritani et al. . |
| 5,782,102 | 7/1998 | Iritani et al. . |

FOREIGN PATENT DOCUMENTS

405193347 * 8/1993 (JP) .

* cited by examiner

Primary Examiner—William Doerrler
Assistant Examiner—Chen-Wen Jiang
(74) Attorney, Agent, or Firm—Abelman, Frayne & Schwab

(57) ABSTRACT

Air conditioning which is designed to cool a vehicle engine and provide air conditioning inside the vehicle is comprised of a condenser (5) cooled by air (6). The condenser (5) is installed in the vehicle and separated from the vehicle radiator (18) so that hot air coming out from the condenser will not pass over the vehicle radiator. The condenser (5) will be placed in some place other than next to the radiator and a fan (4-A) will be installed to provide it with fresh air. A cold low-pressure suction pipe (20) coming from the evaporator (13) is placed inside the vehicle radiator in an area in which water cooling the radiator accumulates in the radiator. The high pressure liquid pipe (7) is split after the receiver in a way that connects to a pipe (16) leading back to the vehicle radiator and connects to another pipe leading to the evaporator. An expansion valve (17) is placed on the first pipe (16) just before the radiator, thus making the evaporator (30) appropriate for installation inside the radiator to cool the radiator.

5 Claims, 2 Drawing Sheets

AIR CONDITIONING FOR COOLING VEHICLE ENGINE AND PROVIDING COOLING INSIDE THE VEHICLE

FIELD OF THE INVENTION

This invention relates to air conditioning and in particular to air conditioning designed to cool a vehicle engine and also provide cooling inside the vehicle.

BACKGROUND OF THE INVENTION

This invention is used to cool all vehicle engines and similar engines, providing them with a longer period of operation. It is known that vehicle air conditioning, upon its operation in the summer, raises the temperature of the vehicle engine, causing engine damage or shortening the period of engine life. In particular, such increased temperature damages most parts of the engine and water hoses, conveyors, wires and other material, thus increasing the consumption of spare parts. This effect occurs because the condenser is place in front of the radiator and heat coming out of the condenser goes to the radiator, raising its temperature and, consequently, the temperature of the vehicle engine. The suction pipe conducting cold air from the evaporator to the compressor could be used to counteract this heating effect, but this is not presently being done. The freon in the form of a liquid in the cold suction pipe also may cause damage to the compressor. The performance of current air conditioning in vehicles is reduced due to the influence of high temperature generated in the air conditioning, especially upon a vehicle stopping or driving slowly, and due to an increase in pressure during the air conditioning cooling cycle.

SUMMARY OF THE INVENTION

This invention makes substantial progress in alleviating the above mentioned problems and dangers. This invention lowers the engine temperature in the summer during air conditioning operation and provides air conditioning inside the vehicle. In addition, it protects the compressor as the freon comes back to the compressor in the form of a gas. This method also increases the engine life and decreases the consumption of spare parts affected by high temperature such as piston rings, oil seals, valves, conveyors, hoses, wires and other materials inside or around the engine.

This invention causes the engine temperature to be about one-quarter of the temperature as identified on temperature measuring devices on the engine during operation in the summer, i.e. when the ambient temperature is 45° C. (113° F.). This reduction in the engine temperature lengthens the life of the engine and improves the air conditioning's performance inside the car. In contrast, the former and current technology causes the high temperature of the engine during air conditioning operation in the summer to be more than one-and-one-half times the specified vehicle temperature. This causes a reduced engine life, the engine being affected by long exposure to high temperature, and causes the consumption of spare parts of the engine, such as piston rings, oil seals, valves, conveyors, hoses, wires and other materials inside or around the engine which are damaged. Sometimes, there is damage in the compressor since the freon goes back to the compressor in the form of a liquid.

DESCRIPTION OF THE PREFERRED EMBODIMENT(S)

Figure 1:
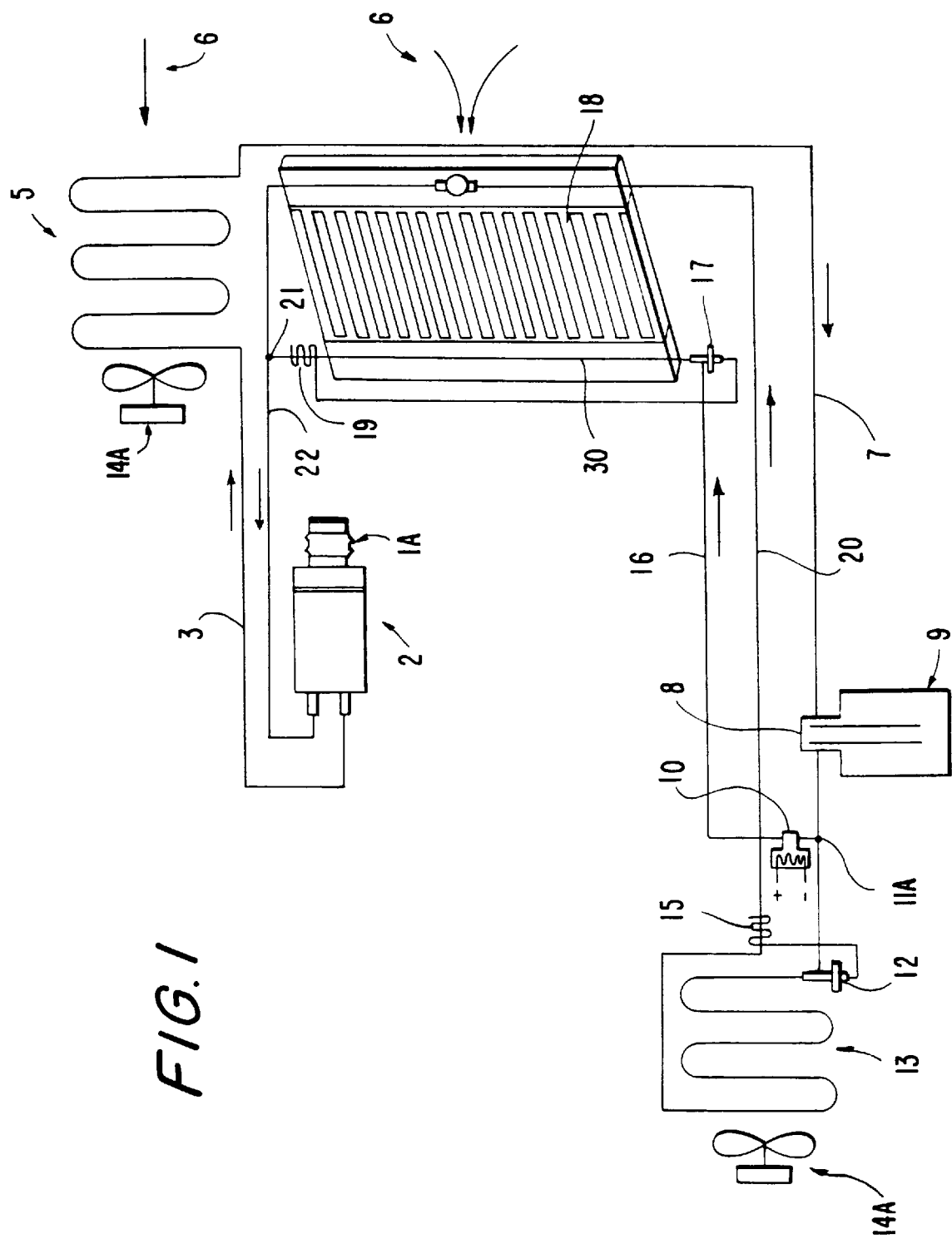
FIG. 1 is a schematic drawing showing the main components of this invention.

FIG. 1 shows the components of the air conditioner designed according to this invention. This invention is comprised of a high capacity compressor (2) for the cooling process in the cooling cycle. The components also include a condenser (5) cooled by air (6) through a fan (4-A). The condenser (5) is installed in any place in the vehicle, provided that it is isolated from the vehicle radiator (18). However, it is preferable that the condenser be installed in one of the internal sides in front of the vehicle. The condenser is preferably made of aluminum pipe with vanes to distribute air and to help transfer heat, but, alternatively, it may be made of brass pipes. The condenser should be of high capacity to transfer heat and loads which pass over it. It is preferable to make dual pipes from the beginning of the condenser until its end, with appropriate diameters for the condensing process. The fan (4-A) will be installed to pass atmospheric air from the outside to the condenser pipes to cool the condenser.

Another one of the components of the invention is the receiver-dryer (9). The receiver-dryer (9) is installed in the high pressure liquid line (7) between the condenser (5) and the evaporator (13). It is preferable for this receiver-dryer (9) to include a sight glass (8) to indicate the state of the flowing freon at this point, the freon passing through in the form of a transparent liquid. The ability to show the freon state at the sight glass (8) will insure better air conditioning. Beyond the receiver-dryer (9), a T-shaped connection is installed for the liquid line coming out of the receiver-dryer (9), and this T-shaped connection connects to two pipes carrying high pressure liquid, the first line leading to the evaporator (13) and the second line to the radiator (18). An expansion valve is installed just before the evaporator (13) to control freon, and the hook bulb of the expansion valve is installed on the suction pipe immediately after the evaporator (13). The evaporator (13) is installed immediately after the expansion valve to cool the air inside the vehicle through passing the air through the pipes of the evaporator (13).

The suction pipe (20) starts from the evaporator and leads to the compressor. The suction pipe should be insulated when it emerges from the evaporator and as it reaches the vehicle radiator. It may be insulated, according to this invention, through one of many available insulator. It is preferable to use rubber insulator appropriate for the diameter of the pipe so that it will not lose its cold temperature until it reaches the radiator. The suction pipe then enters the vehicle radiator to cool it, and the suction pipe is installed in the region of the radiator that accumulates radiator water. The suction pipe then emerges from the radiator on the other side. The suction pipe should preferably be of anti-rust metal since it will be soaked in radiator water from all sides. It is preferably not to be installed by thermal insulator as it emerges from the radiator until it reaches the compressor.

The liquid line (16) going to the vehicle radiator has a solenoid valve (10) installed to open and close the pipe when needed. This value has a special switch which may be operated by the driver of the vehicle to electrically open and close this value. When the engine temperature rises, the driver may open this value to decrease the radiator temperature in addition to the temperature reduction provided by the low temperature of this suction pipe. Opening the valve allow liquid freon to flow towards the radiator. Just before the liquid line (16) enters the radiator, an expansion valve (17) is installed in the place where radiator water tends to accumulate in order to control freon flow. A hooked bulb

(19) is installed connected to the expansion valve (17) and contacting the pipe as it emerges from the radiator. This pipe enters into and emerges from the radiator as an evaporator (30) to cool the engine water in the radiator. After the suction pipe emerges from the radiator evaporator, it is connected to the first suction pipe at a T-shaped connection so that one suction pipe leads to the compressor. Preferably, the suction pipes should not be insulated thermally after they emerge from the radiator to insure the total transformation of the freon vapor to a gas. Preferably, the expansion valve (17) located immediately before the radiator evaporator should be more resistant to the flow of the freon than the expansion valve (12) of the evaporator inside the vehicle in order not to affect the air conditioning performance inside the vehicle.

Figure 2:
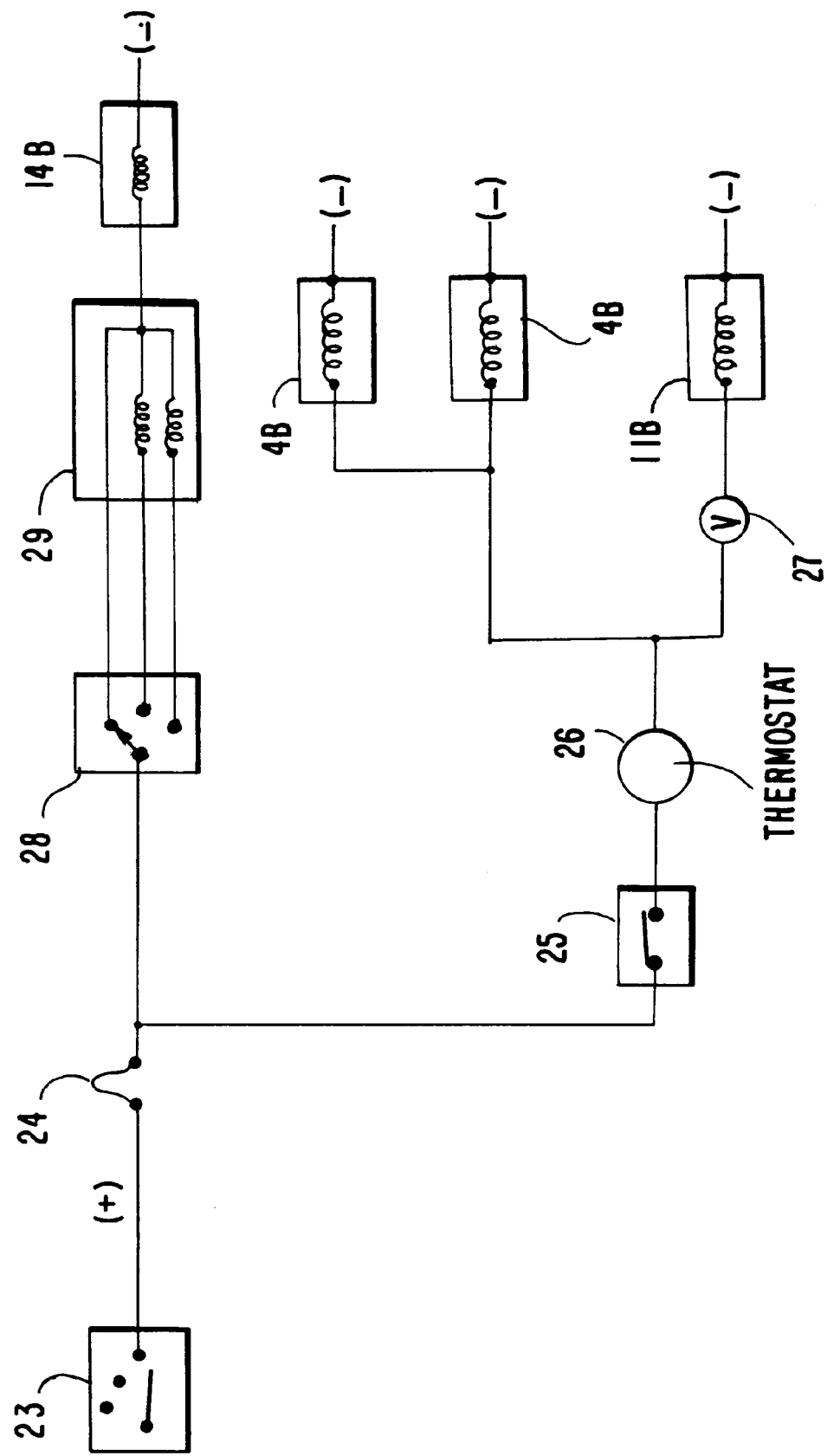
FIG. 2 is a schematic drawing of the electrical network.

FIG. 2 should the electrical connection network to the vehicle air conditioner. This network comprises an engine operation switch (23). A fuse (24), preferably of 30 or 35 amperes, is connected to the operation switch. The fuse (24) is connected to a special switch (25) which operates the compressor of the air conditioner, the condenser fan, and the valve to close and open the radiator evaporator. This special switch (25) is connected to a thermostat (26) which controls the temperature inside the vehicle and the hooked bulb of the thermostat is installed such that it measures the temperature of the cold air immediately after it emerges from the evaporator. The thermostat (26) is connected to an open and close valve (27) for the radiator evaporator. The switch is installed beside the driver. It is connected to a solenoid valve to close and open the radiator evaporator. The compressor clutch (1-B) and a condenser fan motor are connected to the thermostat. A switch (28) is connected to the fuse to control the evaporator fan motor speed. The switch (28) is connected to the fuse (29) to control the evaporator fan speed through the fan switch (28). The fuse (29) is connected to the evaporator fan motor (14-B).

In general, after dismantling or changing some parts of the air conditioning apparatus, it will be reconnected in such a manner as to insure that there is no leakage. After that, it is recommended to carry out a triple discharge process which is considered one of the best ways to discharge the cooling circuit from air and humidity which entered it during dismantling or the changing of its parts. After the first discharge process, the circuit is charged with freon mixed with the remaining air. Then the circuit is discharged for the second time. Finally it is charged for a third time with freon to insure that the air is totally expelled, and the third discharge takes place.

High pressure hoses connected to the freon pipes are installed to absorb vibrations caused during driving of the vehicle. The hook bulbs of the expansion valves should be insulated after placing them on the suction pipes which emerge from the evaporators. Insulation prevents the hook bulbs of the expansion valves from being affected by the atmospheric air. After activating the air conditioning, it needs approximately ten minutes at least until pressures equalize and the required air conditioning is provided. Freon R12 is used to charge the vehicle air conditioning circuit. When charging the circuit with freon, the vehicle engine and compressor should be run at a speed of a least 2,000 revolutions per minute to allow efficient cooling and air conditioning to occur.

What is claimed is:

1. An air conditioner for cooling a vehicle engine, comprising a condenser cooling through atmospheric air coming out from a fan, said condenser being isolated from a radiator of said vehicle, a evaporator installed inside a radiator of said vehicle, and a suction pipe entering inside said radiator of said vehicle.

2. An air conditioner for cooling a vehicle engine, according to claim 1, wherein said condenser is thermally isolated from said radiator of said vehicle and is not put in front of it.

3. An air conditioner for cooling a vehicle engine, according to claim 1, wherein one expansion valve is installed to control the freon and temperature, said expansion valve being of less capacity than an expansion valve of said evaporator inside the vehicle.

4. An air conditioner for cooling a vehicle engine, according to claim 1, wherein said evaporator comprises a solenoid valve installed in a high pressure liquid pipe to control the closing or opening of said pipe.

5. An airconditioner for cooling a vehicle engine, according to claim 1, wherein a suction pipe is installed inside the radiator in order to cool the radiator fluid.

* * * * *